United States Patent
Wada

(10) Patent No.: US 6,343,219 B1
(45) Date of Patent: Jan. 29, 2002

(54) METHOD AND DEVICE FOR ERASING MESSAGE FROM WIRELESS COMMUNICATION DEVICE HAVING A PAGING FUNCTION

(75) Inventor: Akihiko Wada, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/243,690

(22) Filed: Feb. 2, 1999

(30) Foreign Application Priority Data

Feb. 4, 1998 (JP) .......................................... 10-036544

(51) Int. Cl.[7] .......................... H04B 1/38; H04M 11/10; G08B 5/22; G06F 15/16
(52) U.S. Cl. ...................... 455/550; 455/412; 340/7.52; 340/7.51; 709/207
(58) Field of Search ................................ 455/414, 412, 455/550; 340/825.44, 7.51, 7.52, 7.55; 345/326–358

(56) References Cited

U.S. PATENT DOCUMENTS

| | | | | |
|---|---|---|---|---|
| 5,140,561 A | * | 8/1992 | Miyashita et al. | 340/7.52 |
| 5,239,679 A | * | 8/1993 | Murai | 340/7.52 |
| 5,627,764 A | * | 5/1997 | Schutzman et al. | 709/207 |
| 5,757,279 A | * | 5/1998 | Fujiwara | 340/7.55 |
| 5,856,787 A | * | 1/1999 | Ikka | 340/7.41 |
| 6,021,310 A | * | 2/2000 | Thorne | 455/556 X |

* cited by examiner

*Primary Examiner*—Tracy Legree
(74) *Attorney, Agent, or Firm*—Pearne & Gordon LLP

(57) ABSTRACT

A message erasing method for a wireless communications device having a paging function, the method including a step of indicating received messages according to chronological order (on an LCD display); a step in which the user views the display and specifies the position of a message to be erased (by means of a jog dial); and a step of erasing all the messages received before the specified message (by means of a jog dial). By use of this method, the user can readily erase a plurality of unneeded messages.

1 Claim, 5 Drawing Sheets

METHOD AND DEVICE FOR ERASING MESSAGE FROM WIRELESS COMMUNICATION DEVICE HAVING A PAGING FUNCTION

BACKGROUND OF THE INVENTION

The present invention relates to a method and device for erasing a message from a wireless communication device such as a pager, a PHS, or a portable cellular phone. The wireless communication device has means for storing a plurality of messages and is capable of displaying a plurality of character information items. More particularly, the present invention relates to a pager, a PHS, or a portable cellular phone which is arranged so as to be able to readily erase a plurality of unneeded messages, including unread messages.

A method by which a user erases messages from a conventional pager having a display includes a method of individually selecting messages and erasing the thus-selected messages one by one, a method of erasing all the messages that had been read, and a method of unconditionally erasing all the messages.

Under a method by which a pager automatically erases messages, when the message storage capacity of the pager reaches its limit as a result of receipt of messages, the messages that have already been read (hereinafter referred to simply as "already-read messages") are erased according to chronological order of receipt. If there is no already-read messages, messages that have not yet been read (hereinafter referred to as "not-yet-read messages") are also erased according to chronological order of receipt.

In recent years, in association with proliferation of information delivery service by way of a message, the number of messages received and the capacity for storing the thus-received messages have swelled by at least an order of magnitude. Further, in contrast to a message addressed to an individual, an information message does not need to be read by all recipients.

Under the message erasing method for the conventional pager having a display, when the user erases a plurality of messages at one time, there is no alternative but to erase all the messages. Therefore, there is no way to readily erase a plurality of unneeded messages.

SUMMARY OF THE INVENTION

The object of the present invention is to provide a method and a device which enable the user to readily erase at one time a plurality of unneeded messages.

To solve the foregoing problem, the present invention provides a message erasing method for a wireless communications device having a paging function, the method comprising: a step of indicating received messages according to chronological order; a step in which the user views the display and specifies the position of a message to be erased; and a step of erasing all the messages received before the specified message. By use of this method, the user can readily erase a plurality of unneeded messages.

As a result, the user can readily erase at one time a plurality of unneeded messages.

According to a first aspect of the present invention, there is provided a message erasing method for a wireless communication device having a paging function, the method comprising: a step of indicating received messages according to chronological order; a step of specifying the position of a message to be erased by user; and a step of erasing all the messages received before the specified message. By use of this method, the user can readily erase a plurality of unneeded messages.

According to a second aspect of the present invention, there is provided a message erasing method for a wireless communications device having a paging function, the method comprising: a step of indicating received messages according to chronological order; a step specifying a beginning of a range of messages to be erased; a step specifying an end of the range; and a step of erasing all the received messages within the range between the beginning and the end specified by the user. By use of this method, the user can readily erase at one time unneeded messages specified by the user.

According to a third aspect of the present invention, there is provided a message erasing method for a wireless communications device having a paging function, the method comprising: a step of indicating received messages according to chronological order; a step specifying a position of a message to be erased; and a step of erasing all the messages received before the specified message specified by the user, except for messages having not yet been read. By use of this method, the user can readily erase a plurality of unneeded messages at one time, except for messages which have not yet been read by the user.

According to a fourth aspect of the present invention, there is provided a message erasing method for a wireless communications device having a paging function, the method comprising: a step of indicating received messages according to chronological order; a step specifying a beginning of a range of messages to be erased; a step specifying an end of the range; and a step of erasing all the messages within the range between the beginning and the end specified by the user but having not yet been read by the user. By use of this method, the user can readily erase a plurality of unneeded messages at one time, except for messages which have not yet been read by the user.

According to a fifth aspect of the present invention, there is provided a message erasing method for a wireless communications device having a paging function, the method comprising: a step of indicating received messages according to chronological order of receipt; a step specifying, one by one, the positions of messages to be erased; and a step of collectively erasing the messages specified one by one. By use of this method, the user can collectively erase the messages specified one by one.

According to a sixth aspect of the present invention, there is provided a message erasing method for a wireless communications device, the method comprising: a step of indicating received messages according to chronological order; a step of specifying the beginning of a range of messages to remain unerased; a step of specifying the end of the range; and a step of erasing all unspecified messages while the messages within the range between the beginning and the end specified by the user remain unerased. By use of this method, the user can readily erase all unspecified messages at one time while the received messages included in the range between the begging and the end specified by the user remain unerased.

According to a seventh aspect of the present invention, a message erasing method for a wireless communications device having a paging function, the method comprising: a step of indicating received messages according to chronological order; a step of specifying the position of a message to remain unerased one by one; and a step of collectively erasing the remaining messages while the messages specified one by one remain unerased. By use of the method, the user can collectively erasing all unspecified messages while the messages specified one by one remain unerased.

According to an eighth aspect of the present invention, there is provided a message erasing method for a wireless communications device having a paging function, the method comprising: a step of indicating received messages according to chronological order; a step of specifying specific character strings, marks, or symbols; and a step of erasing all the messages assigned the specific character strings, marks, or symbols specified by the user. By use of the method, the user can erase all the messages assigned the specific character strings, marks, or symbols specified by the user.

According to a ninth aspect of the present invention, there is provided a message erasing method for a wireless communications device having a paging function, the method comprising: a step of indicating received messages according to chronological order; a step of specifying time or date-and-hour information through input operations; and a step of erasing all the messages received before the message that was received at the specified time or date-and-hour. By use of this method, the user can readily erase a plurality of unneeded messages by specifying only time or date-and-hour information byway of input operations.

According to a tenth aspect of the present invention, there is provided a message erasing device for a wireless communications device having a paging function, the device comprising: message display means for indicating received messages according to chronological order; erase position designation means which enables the user to view the display indicated by the message display means and to designate the position of a message to be erased; and message erasing means for erasing all the messages received before the message designated by the erase position designation means. With this device, the user can readily erase a plurality of unneeded messages.

According to an eleventh aspect of the present invention, there is provided a message erasing device for a wireless communications device having a paging function, the device comprising: message display means for indicating received messages according to chronological order; beginning-of-erase-range designation means which enables the user to view the display indicated by the message display means and to designate the beginning of a range of messages to be erased; end-of-erase-range designation means which enables the user to view the display provided by the message display means and to designate the end of the range; and message erasing means for erasing all the received messages included in-the range between the beginning and the end designated by the user. With this device, the user can readily erase at one time a plurality of unneeded messages designated by the user.

DETAILED DESCRIPTION OF THE PREFERRED EMBODIMENTS

A preferred embodiment will be described by reference to the accompanying drawings.

Figure 1:
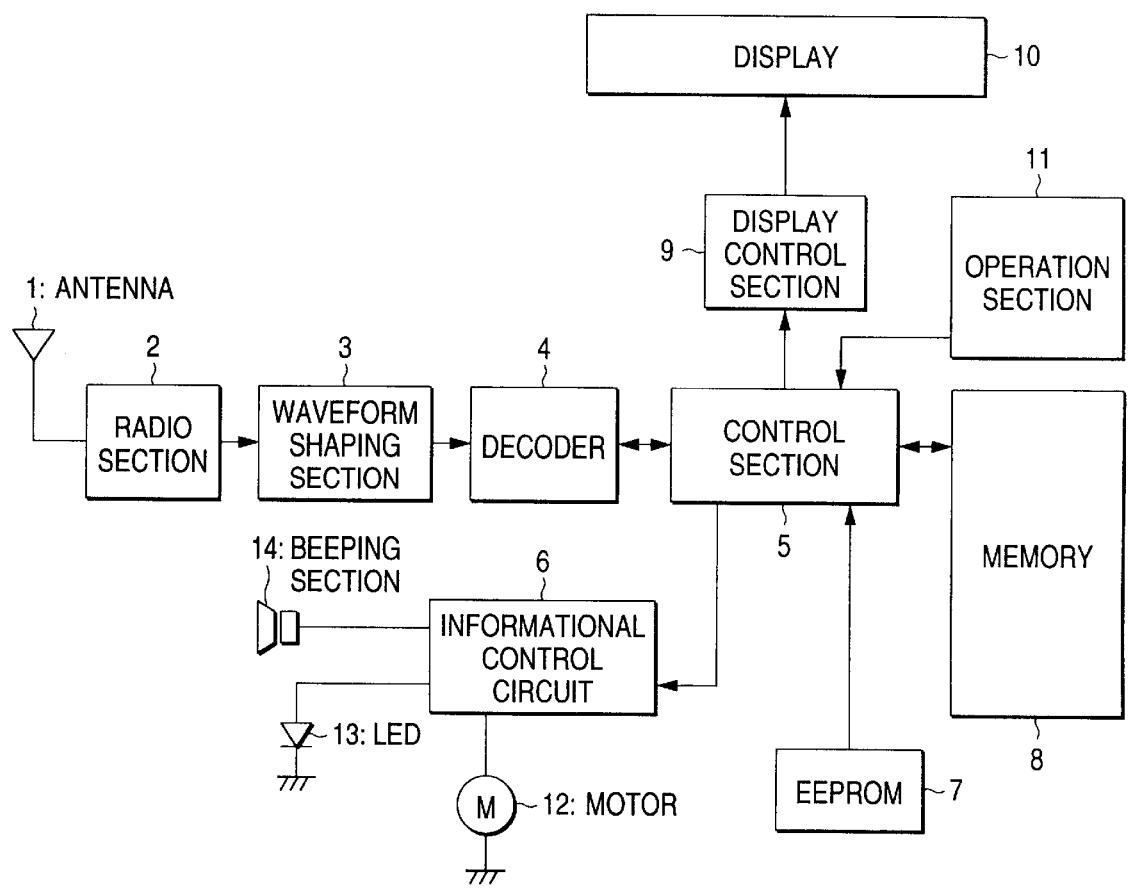
FIG. 1 is a block diagram showing the configuration of a wireless communications device having a paging function according to a preferred embodiment of the present invention.

FIG. 1 is a block diagram showing the configuration of a wireless communications device having a paging function according to an embodiment of the present invention, e.g., the configuration of a pager having-a-display. In FIG. 1, a wireless communications device having a paging function comprises an antenna 1, a radio section 2, a waveform shaping section 3, a decoder 4, a control section 5, an informational control circuit 6, EEPROM 7, a memory section 8, a display control circuit 9, a display section 10, an operation section 11, a motor section 12, an LED section 13, and a beeping section 14.

Next, a common operation of a wireless communications device having a paging function will be described. A high frequency signal received by way of the antenna section 1 and the radio section 2 is demodulated into a digital signal by means of the waveform shaping section 3. The digital signal is input to the decoder 4. The decoder 4 decodes the digital signal. If the address of the digital signal matches a selective paging address of the pager written into the EEPROM 7, the control section 5 activates the informational control circuit 6, thereby driving the LED 13 together with the beeping section 14 or the motor 12. As a result, the user of the pager is informed of receipt of an incoming call addressed to the pager.

If a message signal is added following the address, the decoder 4 decodes the message signal and stores the thus-decoded message signal in the memory section 8 together with an arrival time. At this time, the control section 5 determines whether or not a calling party identification code and a continuous message code are included in the message. If these codes are included in the message, the calling party identification code and the continuous message code are stored in the memory section 8. When the user actuates a function button provided in the operation section 11, e.g., a jog dial, the control section 5 reads the message data from the memory section 8. The display control section 9 indicates the thus-read message data on the display section 10.

The user can read the thus-stored message again from the memory 8 by pressing the function button provided in the operation section 11.

A message erasing method according to the present invention will now be described by reference to FIGS. 2 through 5 and Table 1.

Figure 2:
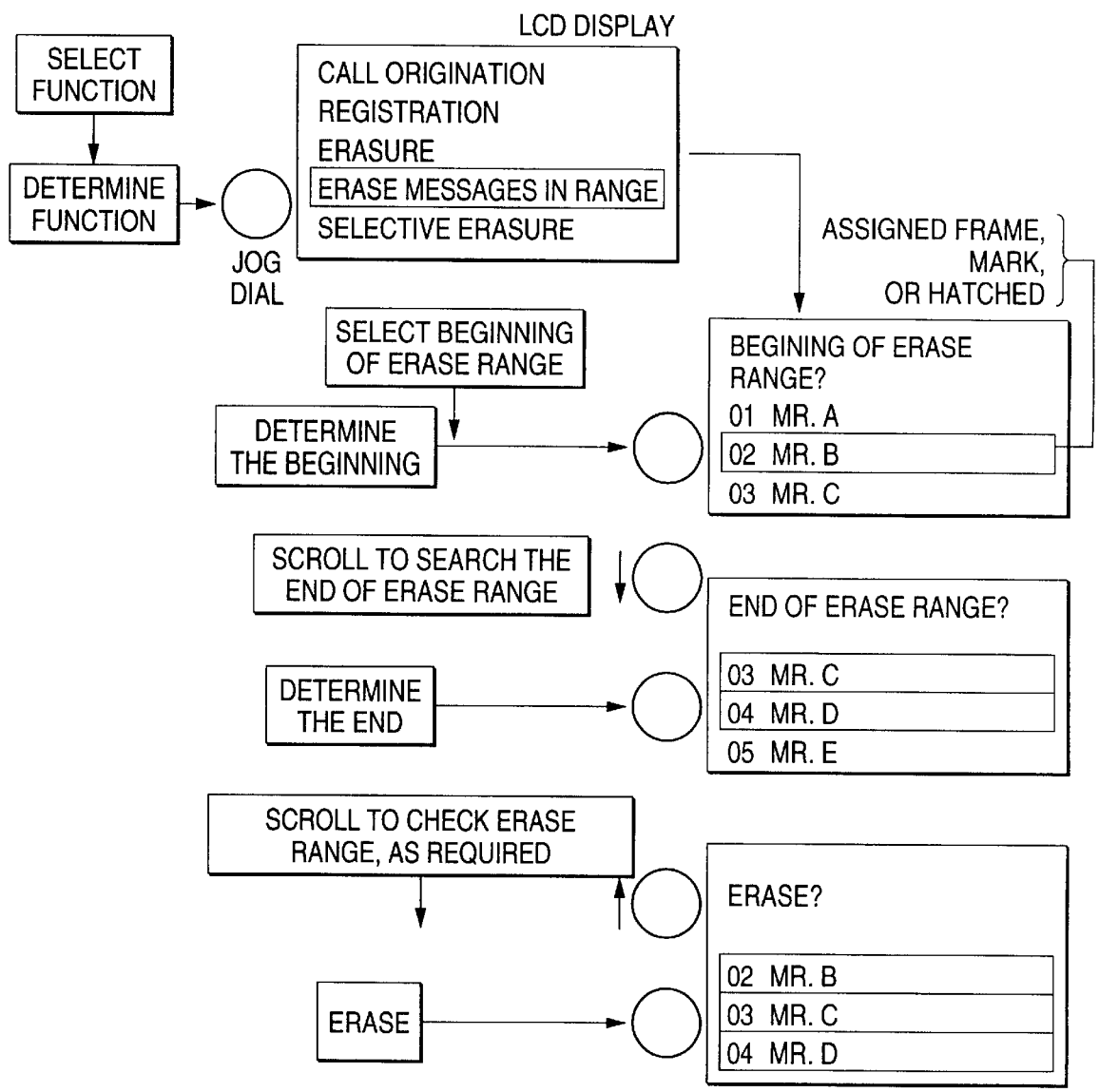
FIG. 2 is a flowchart for describing operations of the wireless communications device according to a method of erasing the first through fourth messages, according to the embodiment.

FIG. 2 shows one example of the method of erasing a message according to the present embodiment. In FIG. 2, a menu is indicated on the display section (e.g., a display section consisting of an LCD) 10. The user selects a function and determines processing by actuation of the function button provided in the operation section 11, e.g., a jog dial. Next, the user selects and determines the beginning of an erase range, by actuation of a function button provided in the operation section, e.g., a jog dial. The user then scrolls through the display to search the end of the erase range by actuation of the function button provided in the operation section, e.g., a jog dial. The end of the erase range is selected and determined. If necessary, the user can scroll through the erase range for checking by actuation of the function button provided in the operation section 11, e.g., a jog dial. If the use-r selects to erase the messages in the erase range by pressing the function button provided in the operation section 11 after verification, the messages in the erase range from the beginning to the end are erased.

Table 1 shows an example in which received information messages are stored in memory according to chronological order and are indicated while being identified as being already read or as not yet being read.

TABLE 1

| Message No. | Read Status | Messages | Receipt Time |
|---|---|---|---|
| 122 | Read | Morning News on 21st | January 21 AM8:00 |
| 121 | Unread | Weather Forecast for Tokyo on 21st | January 21 AM7:45 |
| 120 | Read | Evening News 5 . . . on 20th | January 20 PM9:30 |
| 61 | Read Unread | Weather Forecast for Tokyo on 20 | January 20 AM7:45 |
| 60 | Unread | Evening News 5 . . . on 19 | January 19 PM9:30 |
| 1 | Read Read | Morning News 1 . . . on 19 | January 19 AM8:00 |

An explanation will be given of a method of erasing the first message in Table 1. For example, when the user desires to erase messages date before January 20, including unread messages, the message assigned No. 120 (the beginning of the erase range) is selected and erased, the messages from No. 1 to No. 120 can be erased at one time. Under the conventional method, there is no alternative but to collectively erase all the messages, except for unread messages. Accordingly, it is impossible to erase specific messages. Further, it is impossible to collectively erase unread messages.

By reference to Table 1, an explanation will now be given of a second method of erasing messages. For example, when the user desires to erase unread messages including the messages dated January 20, the message No. 61 (the end of the erase range) and the message No. 120 (the beginning of the erase range) are selected for erasure. Under the conventional method, there is no alternative but to collectively erase all the messages, except for unread messages. Accordingly, it is impossible to erase specific messages. Further, it is impossible to collectively erase unread messages.

By reference to Table 1, an explanation will now be given of a third method of erasing messages. For example, when the user desires to erase the messages dated before January 20, except for unread messages, the message No. 120 (the beginning of the erase range) is selected and erased, whereby messages from No. 1 to No. 120 can be erased at one time, except for unread messages No. 60 and 61. Under the conventional method, there is no alternative but to collectively erase unread messages.

By reference to Table 1, an explanation will now be given of a fourth method of erasing messages. For example, when the user desires to erase the messages dated January 20, except for unread messages, the message No. 61 (the end of the erase range) and the message No. 120 (the beginning of the erase range) are selected for erasure, thereby enabling erasure of the messages from No. 61 to No. 120 at one time, except for the unread message No. 61. Under the conventional method, there is no alternative but to collectively erase unread messages.

Figure 3:
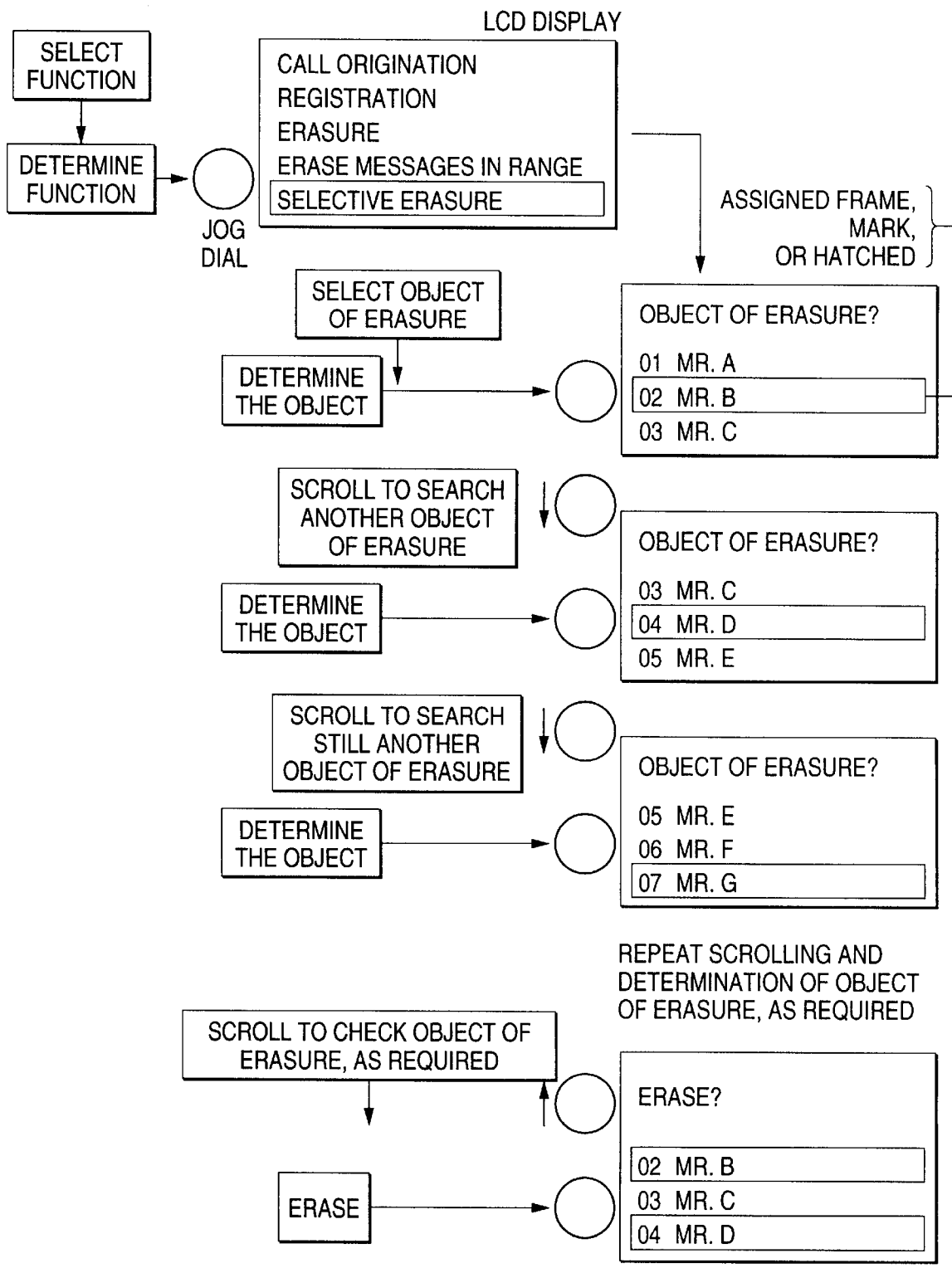
FIG. 3 is a flowchart for describing operations of the wireless communications device according to a method of erasing the fifth message, according to the embodiment.

By reference to FIG. 3, an explanation will now be given of a fifth method of erasing messages. In FIG. 3, a menu is indicated on a display section (e.g., a display section consisting of an LCD) 10. The user selects a function and determines processing by actuation of a function button provided in the operation section 11, e.g., a jog dial. Through actuation of a function button provided in the operation section 11, e.g., a jog dial, the user selects and determines a message to be erased. If there is another message to be -erased, the user scrolls through the messages to search a message to be erased by actuation of the function button provided in the operation section 11, e.g., a jog dial. Further, if necessary, the user can scroll to check the message to be erased by actuation of the function button provided in the operation section 11, e.g., a jog dial. So long as the user selects erasure by pressing the function button provided in the operation section 11 after checking, the messages designated by the user one by one can be collectively erased.

The messages in the range from the beginning to the end are erased.

Figure 4:
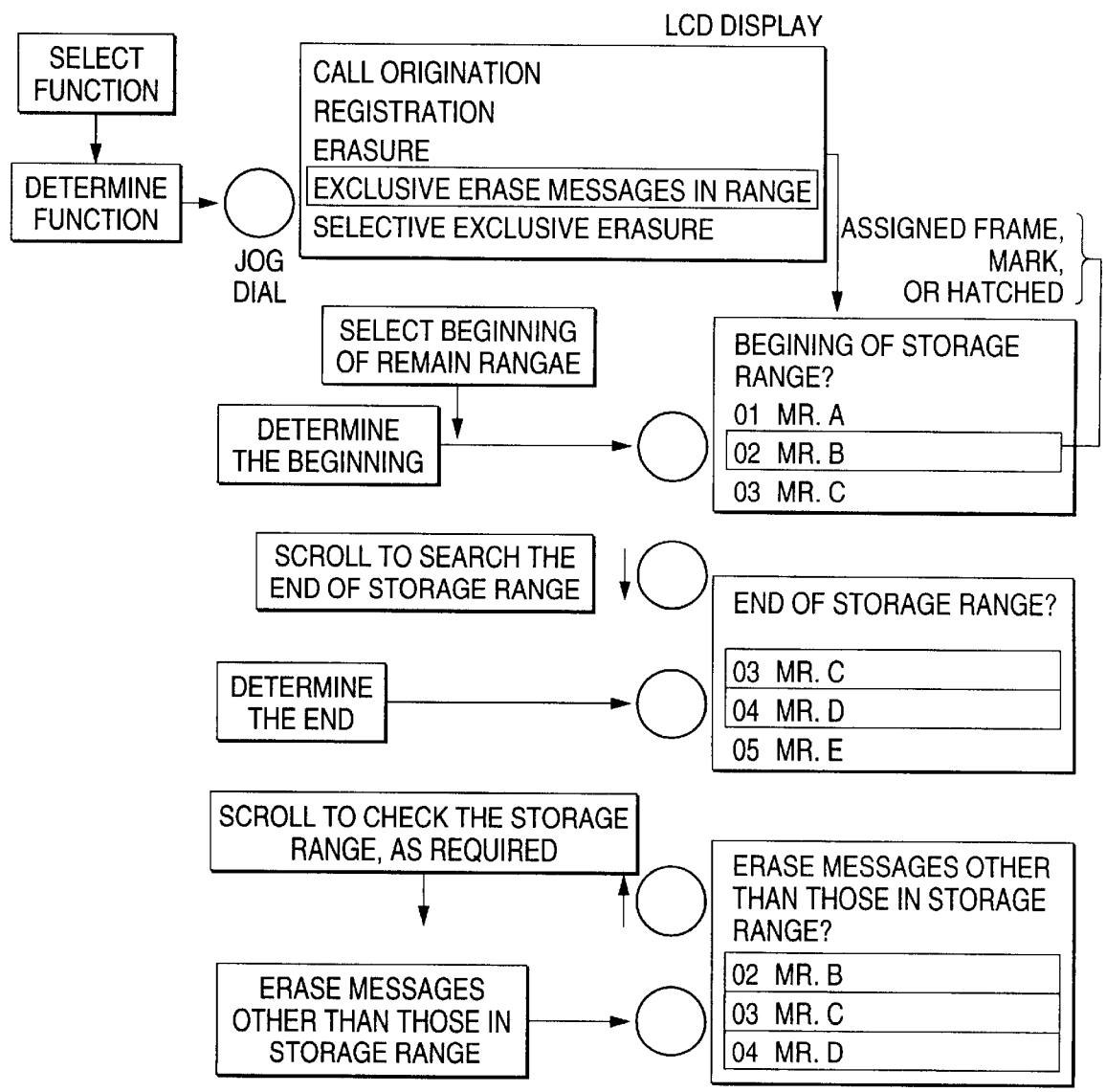
FIG. 4 is a flowchart for describing operations of the wireless communications device according to a method of erasing the sixth message, according to the embodiment.

By reference to FIG. 4, an explanation will now be given of a sixth method of erasing messages. In FIG. 4, a menu is indicated on a display section (e.g., a display section consisting of an LCD) 10. The user selects a function and determines processing by actuation of a function button provided in the operation section 11, e.g., a jog dial. Through actuation of a function button provided in the operation section 11, e.g., a jog dial, the user selects and determines the beginning of the range of messages to remain unerased. Further, the user scrolls through the messages to select and determine the end of the range. If necessary, the user can scroll to check the range of messages to remain unerased, by actuation of the function button provided in the operation section 11, e.g., a jog dial. So long as the user selects erasure by pressing the function button provided in the operation section 11 after checking, all the messages other than the messages included in the range designated by the user can be readily erased at one time.

Figure 5:
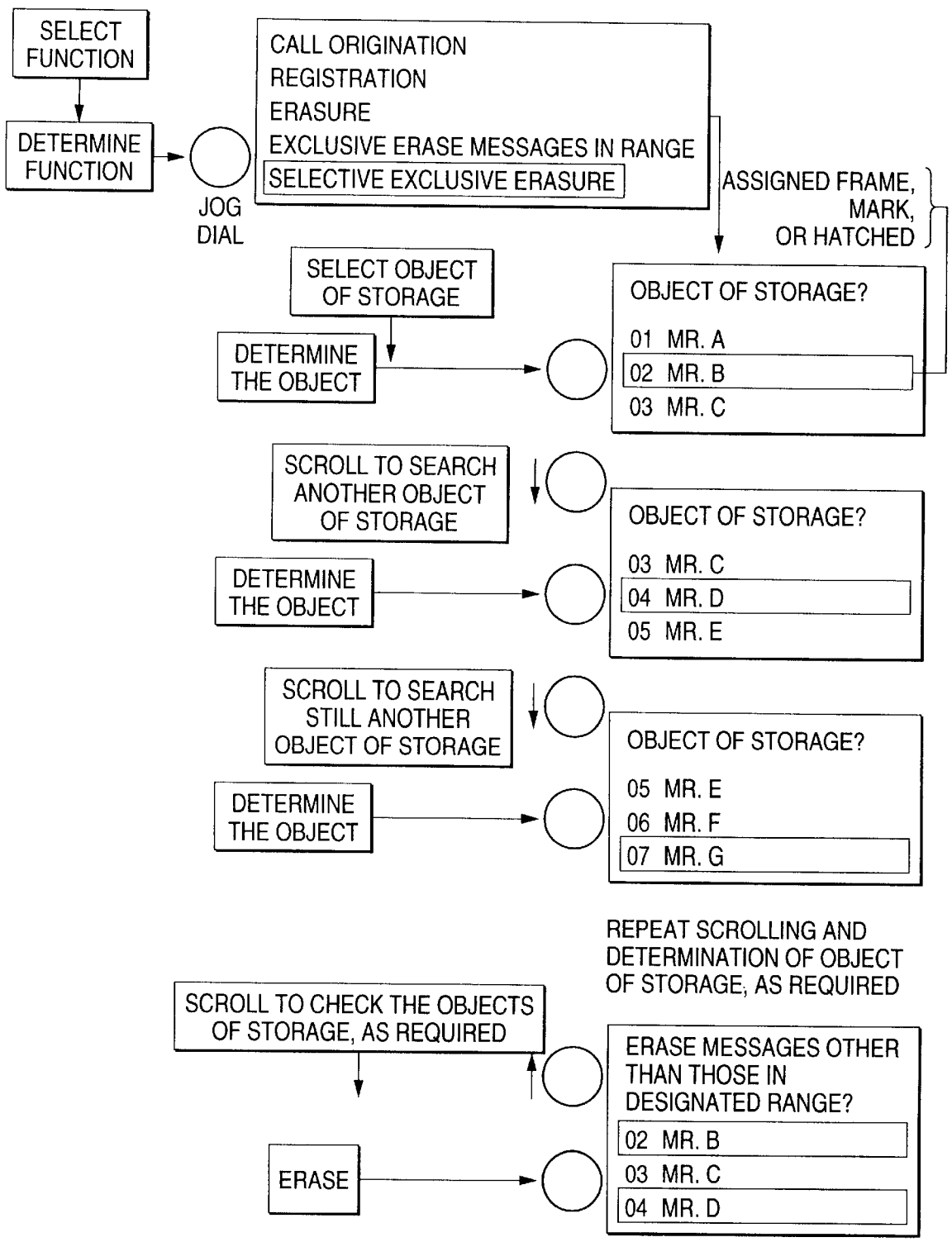
FIG. 5 is a flowchart for describing operations of the wireless communications device according to a method of erasing the seventh message, according to the embodiment.

By reference to FIG. 5, an explanation will now be given of a seventh method of erasing messages. In FIG. 5, a menu is indicated on a display section (e.g., a display section consisting of an LCD) 10. The user selects a function and determines processing by actuation of a function button provided in the operation section 11, e.g., a jog dial. Through actuation of a function button provided in the operation section 11, e.g., a jog dial, the user selects and determines the messages to remain unerased. Further, the user scrolls through the messages to select and determine other messages to remain unerased. If necessary, the user can scroll to check the messages to remain unerased, by actuation of the function button provided in the operation section 11, e.g., a jog dial. After checking, the user can collectively erases all the remaining messages other than the messages that are designated by the user one by one to remain unerased.

Although not shown in the drawings, if the user designates a specific character string, mark, or symbol by actuation of the function button provided in the operation section 11, e.g., a jog dial, while viewing the display, all the messages assigned the specific character string, mark or symbol can be erased.

Although not shown in the drawings, if the user specifies and enters time or date-and-hour information by actuation of the function button provided in the operation section 11, e.g., a jog dial, while viewing the display, all the messages received before the message received at the specified time or date-and-hour can also be erased. The user can readily erase a plurality of unneeded messages by entry and designation of time or date-and-hour information.

A wireless communications device having a paging function according to the present invention can be applied to other devices other than the pager having a display, such as a PHS or a portable cellular phone which has means for storing a plurality of messages.

As has been described, the present invention provides a message erasing method for a wireless communications device having a paging function, the method comprising: a step of indicating received messages according to chronological order; a step OF specifying the position of a message to be erased; and a step of erasing all the messages received before the specified message. By use of this method, the user can readily erase a plurality of unneeded messages.

What is claimed is:

1. A message erasing method for a wireless communications device having a paging function, the method comprising:

A step of indicating received messages according to chronological order;

a step of specifying specific character strings, marks, or symbols associated with a message; and a step of erasing all the messages associated with the specific character strings, marks, or symbols specified by the user.

* * * * *